United States Patent [19]

Gustafson

[11] 4,113,646
[45] Sep. 12, 1978

[54] AIR REVITALIZATION COMPOSITIONS

[75] Inventor: Paul R. Gustafson, Oxon Hill, Md.

[73] Assignee: The United States of America as represented by the Secretary of the Navy, Washington, D.C.

[21] Appl. No.: 790,623

[22] Filed: Apr. 25, 1977

[51] Int. Cl.² .................. C01B 13/02; A62B 21/00
[52] U.S. Cl. .................................. 252/184; 252/186;
252/192; 423/230; 424/366; 422/123
[58] Field of Search .................. 252/186, 184, 192;
23/281; 423/230, 581

[56] References Cited

U.S. PATENT DOCUMENTS

| 3,443,906 | 5/1969 | McGoff et al. | 23/281 |
| 3,446,744 | 5/1969 | Topper | 252/186 |
| 3,702,305 | 11/1972 | Thompson | 252/186 |
| 3,749,678 | 7/1973 | Thompson | 252/186 |
| 3,767,367 | 10/1973 | Rio | 23/281 |
| 4,020,833 | 5/1977 | Rind | 252/186 |

Primary Examiner—Benjamin R. Padgett
Assistant Examiner—Irwin Gluck
Attorney, Agent, or Firm—R. S. Sciascia; Philip Schneider; Thomas McDonnell

[57] ABSTRACT

Air revitalization compositions containing potassium superoxide which further comprises from about 2 to about 10 weight percent of lithium monoxide, from about 0 to about 2 weight percent of silicon dioxide, and either from 5 to 10 weight percent of lithium metaborate or from 3 to 8 weight percent of calcium sulfate.

4 Claims, 1 Drawing Figure

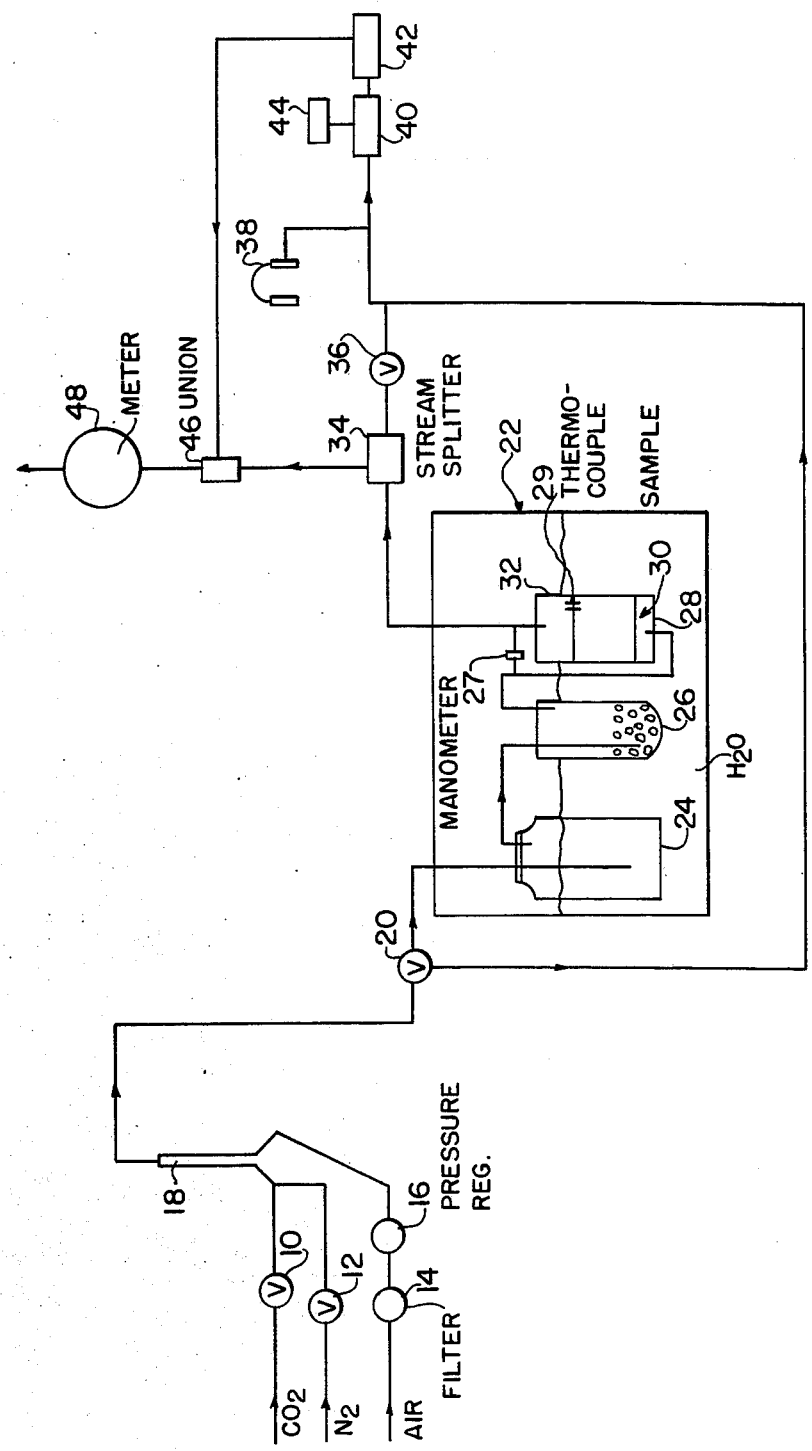

AIR REVITALIZATION COMPOSITIONS

BACKGROUND OF THE INVENTION

The invention relates generally to air revitalization materials and in particular to potassium superoxide.

Potassium superoxide is widely used as an air revitalization material in closed-circuit rebreather devices. The compound operates by absorbing $CO_2$ and by giving off oxygen as is shown by the following equation:

$$2KO_2 + CO_2 \rightarrow K_2CO_3 + 1\tfrac{1}{2} O_2$$

Although some water is required to force the reaction to the right, too much water causes an excessive oxygen evolution in relation to the carbon dioxide absorbed and severe fusion results. Also a high relative humidity RH or a high temperature produces the same result. Fusion retards and can even stop the reaction by sealing unreacted potassium superoxide with fused potassium superoxide. One solution to this fusion problem of potassium superoxide is through the addition of asbestos. The major disadvantages of asbestos are the potential injury to health, in that, asbestos dust is believed to cause cancer and the required applied pressure in the system due to the density of a pellet made from asbestos and potassium superoxide.

SUMMARY OF THE INVENTION

It is therefore an object of this invention to improve the performance of potassium superoxide as an air revitalization material.

Another object of this invention is to diminish the need for rapid heat dissipation and thus to allow a greater latitude in the design of closed-circuit breathers.

A further object of this invention is to reduce the tendancy of potassium superoxide to fuse.

A still further object of the invention is to better maintain the $O_2$ evolution in relation to the $CO_2$ absorption.

These and other objects are achieved by admixing, with potassium superoxide a mixture which comprises, in amounts based on total composition weight, anhydrous calcium sulfate at 3 to 8 weight percent, silicon dioxide at 0 to 2 weight percent, and lithium monoxide at 2 to 10 weight percent; or which comprises lithium monoxide at 2 to 10 weight percent, lithium metaborate at 5 to 10 weight percent, and silicon dioxide at 0 to 2 weight percent.

BRIEF DESCRIPTION OF THE DRAWING

The testing and effectiveness of the present invention are better understood from the following description when read in conjunction with the accompanying drawing in which:

The FIGURE is an apparatus for testing air revitalization materials for carbon dioxide absorption and oxygen evolution.

DETAILED DESCRIPTION OF THE INVENTION

The lithium monoxide is of an absorbant grade and has a particle size of at most 40 mesh. The anhydrous calcium sulfate has a purity of at least CP grade and a particle size from 20 to 30 mesh. With silica ($SiO_2$), the form is amorphous with a purity of at least CP grade and with a particle size of at least 325 mesh. The lithium metaborate has a purity of at least CP grade and a particle size of at most 40 mesh.

The ingredients are mixed with $KO_2$ in any order. Any type of mixing is possible so long as a uniform mix is obtained. Of course, the mixing atmosphere must be moisture free. After the ingredients are mixed together, one of the resulting air revitalization compositions comprises from 2 to 10 weight percent and preferably from 4 to 6 weight percent of lithium monoxide, 3 to 8 weight percent and preferably from 4 to 6 weight percent of anhydrous calcium sulfate, from 0 to 2 weight percent and preferably from 0.5 to 1.5 weight percent of silica, and potassium superoxide. The other air revitalization composition comprises from 2 to 10 weight percent and preferably from 4 to 6 weight of lithium monoxide, from 5 to 10 weight percent and preferably from 6 to 8.5 weight percent of lithium metaborate, from 0 to 2 weight percent and preferably from 0.5 to 1.5 weight percent of silica, and potassium superoxide.

The physical characteristics of the composition of this invention are similar to potassium superoxide. Consequently, this composition may be used in the same manner as potassium superoxide except that the previous restrictions required by the tendancy of superoxide to fuse because of heat and moisture have been reduced. As the following examples demonstrate, air with 100% relative humidity (RH) can be successfully used and the maximum temperature of the composition has been significantly raised.

The apparatus used for the following examples is schematically shown in FIG. 1. The apparatus operates by admitting carbon dioxide through a control valve 10. Nitrogen may be introduced into the system through control valve 12. Air is then admitted through a main-line-pressure reducer and filter 14 and is controlled by a pressure regulator 16. The gas passes through a precision bore flowmeter 18 and is controlled by a two-way valve 20 which normally passes the mixture to the 250 ml gas washing bottle 24 but may also be used as a by-pass to $CO_2$-analyzer 40. The gas-washing bottle 24 is in a water bath 22 which is thermostated at 37° C. Washing bottle 24 saturates the gas mixture with distilled water which fills the bottle three-fourths full. From the washing bottle, the gas mixture passes to spray trap 26 wherein glass beads or glass wool provides a surface for the condensation of excess water and further insures uniformity of temperature, and then passes through sample holder 28 which contains a sample resting on a glass fritted disc, 30, and a quantity of packing 32, e.g., glass wool. The pressure drop across the sample holder 28 is measured by manometer 27 and the temperature of the sample is measured by thermocouple 29. The effluent gas mixture then passes through stream splitter 34 which divides the effluent into two portions. The major portion passes through union 46 while the minor portion passes through a needle valve 36, on to a Liston-Becker $CO_2$ analyzer 40 and a Pauling Meter 42. Connected to analyzer 40 is a recorder 44.

The gas pressure drop through the Liston-Becker analyzer is maintained at 2 cm of water maximum by a water-filled pressure relief 38. After passing through the $CO_2$ analyzer, the minor portion recombines with the major portion at union 46. The wet test meter 48, therefore, measures the entire gas flow. The $CO_2$ concentration of the gas stream is periodically checked by diverting the gas momentarily through the sample by-pass to the $CO_2$ analyzer 40 and Pauling Meter 42.

The air-revitalization material samples were pressed into a cake with a pressure of 1700 psi. The relative humidity was 100% and the water bath was 37° C. In Tables I and II, the flow rate for the gas was 6 liters/min and in Tables III and IV, the flow rate was 7 liters/min.

TABLE I

| Sample No. | Additive | $O_2/CO_2$ AVE 0-20 Minutes | $O_2/CO_2$ AVE 20-45 Minutes | Max. Temp. °C | Cake Density g/cm³ | Manometer Change inches/$H_2O$ 20 Min | Max |
|---|---|---|---|---|---|---|---|
| 1 | $KO_2$ only | 2.09 | 1.73 | 147 | 1.35 | 1½ | 2¼ |
| 2 | $KO_2$ only | 1.97 | 1.98 | 150 | 1.34 | 1 | 1½ |
| 3 | 5% $Li_2O$ + 8% $CaSO_4$ (30-40) | 1.88 | 0.82 | 209 | 1.15 | 2¼ | 15⅜ |
| 4 | 5% $Li_2O$ + 5% $CaSO_4$ (20-30 mesh) + 1% Airborne Silica | 1.72 | 1.17 | 201 | 1.19 | ⅞ | 1⅛ |
| 5 | 5% $Li_2O$ + 5% $CaSO_4$ (30-40 mesh) + 1% Airborne Silica | 1.86 | 0.93 | 214 | 1.19 | 1⅛ | 1⅛ |

TABLE II

| Sample No. | $CO_2$ % Removed from the Influent 20 Min. | $CO_2$ Sorbed cm³/9 cm³/cm³ 20 Min. | $CO_2$ Sorbed cm³/9 cm³/cm³ 45 Min. | $CO_2$ Sorbed % of Theoretical 45 Min. | $O_2$ Evolved cm³/9 cm³/cm³ 20 Mon. | $O_2$ Evolved cm³/9 cm³/cm³ 45 Min. | $O_2$ Evolved % of Theoretical 45 Min. |
|---|---|---|---|---|---|---|---|
| 1 | 61 | 58 / 78 | 89 / 120 | 57 | 122 / 165 | 173 / 234 | 73 |
| 2 | 64 | 58 / 74 | 95 / 127 | 60 | 115 / 154 | 164 / 220 | 69 |
| 3 | 79 | 76 / 104 | 107 / 147 | 68 | 173 / 237 | 206 / 282 | 87 |
| 4 | 92 | 95 / 115 | 121 / 146 | 77 | 176 / 213 | 182 / 220 | 77 |
| 5 | 89 | 89 / 114 | 108 / 138 | 69 | 186 / 238 | 196 / 251 | 83 |

TABLE III

| Sample No. | Additive | Duration of Run Mins. | $O_2KO_2$ AVE 0-20 Min 20-End | Max. Temp. °C | Cake Density | Manometer Change Inches/$H_2O$ 10 Min | 20 Min | 30 Min | Max |
|---|---|---|---|---|---|---|---|---|---|
| 6 | $KO_2$ only | 45 | 1.89 | 160 | 1.28 | 3½ | 7¼ | 8¾ | 9½ |
| 7 | 5% $Li_2O$ + 8% $CaSO_4$(20-30 Mesh) | 44 | 1.70 | 255 | 1.15 | 1⅛ | 3½ | 4⅛ | 16¼ |
| 8 | 5% $Li_2O$ + 5% $CaSO_4$(20-30 Mesh) + 1% Airborne Silica | 45 | 1.62 | 223 | 1.13 | 1⅛ | 2⅜ | 2⅜ | 2⅞ |

TABLE IV

| Sample No. | $CO_2$ % Removed from the Influent 20 Min. | $CO_2$ Sorbed cm³/g cm³/cm³ 20 Min. | Total $CO_2$ Sorbed cm³/g cm³/cm³ | $CO_2$ Sorbed % of Theoretical | $O_2$ Evolved cm³/g cm³/cm³ 20 Min. | Total $O_2$ Evolved cm³/g cm³/cm³ | $O_2$ Evolved % of Theoretical |
|---|---|---|---|---|---|---|---|
| 6 | 78 | 81 / 104 | 115 / 147 | 73 | 152 / 194 | 177 / 207 | 75 |
| 7 | 80 | 102 / 117 | 125 / 144 | 80 | 174 / 200 | 184 / 212 | 78 |
| 8 | 81 | 107 / 121 | 146 / 165 | 93 | 173 / 195 | 212 / 240 | 90 |

As the results demonstrate, the composition of the present invention have a better $O_2CO_2$ ratio, maximum operating temperature, oxygen evolution and carbon dioxide absorption than has pure potassium superoxide. Thus the disclosed additional ingredients provide an inportant improvement in performance of potassium superoxide, the most widely used air-revitalization material.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In an air-revitalization composition which comprises potassium superoxide, the improvement which comprises, based on the total composition weight, from about 2 to about 10 weight percent of lithium monoxide, from about 0 to about 2 weight percent of silicon dioxide, and a salt selected from the group consisting of calcium sulfate and lithium metaborate, provided that, calcium sulfate is in amount from about 3 to about 8 weight percent and lithium metaborate is in an amount from 5 to 10 weight percent.

2. The composition of claim 1 wherein lithium monoxide is in an amount from 4 to 6 weight percent and silica is from 0.5 to 1.5 weight percent.

3. The composition of claim 2 wherein said salt is calcium sulfate in an amount from 4 to 6 weight percent.

4. The composition of claim 3 wherein said salt is lithium metaborate in an amount from 6 to 8.5 weight percent.